United States Patent
Janky

(10) Patent No.: US 7,596,194 B2
(45) Date of Patent: Sep. 29, 2009

(54) SYSTEM AND METHOD FOR AUTOMATIC ROAMING IN LAND MOBILE RADIO SYSTEMS

(75) Inventor: William Oscar Janky, Goode, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 615 days.

(21) Appl. No.: 11/237,212

(22) Filed: Sep. 28, 2005

(65) Prior Publication Data

US 2007/0072554 A1   Mar. 29, 2007

(51) Int. Cl.
  *H03D 1/04*     (2006.01)
  *H04B 17/00*    (2006.01)
(52) U.S. Cl. .................... 375/346; 455/67.13
(58) Field of Classification Search ............ 375/346; 455/436–442; 370/331–333
See application file for complete search history.

(56) References Cited

U.S. PATENT DOCUMENTS

| | | | |
|---|---|---|---|
| 5,261,117 A * | 11/1993 | Olson ................. | 455/510 |
| 5,265,262 A * | 11/1993 | Grube et al. .......... | 455/17 |
| 5,355,517 A * | 10/1994 | Olson ................. | 455/510 |
| 5,471,671 A | 11/1995 | Wang et al. | |
| 5,475,683 A | 12/1995 | Harrison et al. | |
| 5,481,545 A * | 1/1996 | Maedjaja et al. ...... | 370/327 |
| 5,553,243 A | 9/1996 | Harrison et al. | |
| 5,761,240 A | 6/1998 | Croucher, Jr. | |
| 6,006,106 A * | 12/1999 | Cook et al. .......... | 455/552.1 |
| 6,292,660 B1 | 9/2001 | Hartless et al. | |
| 6,510,189 B1 | 1/2003 | Hiramatsu et al. | |
| 7,047,037 B2 * | 5/2006 | Ormson .............. | 455/552.1 |
| 2002/0102977 A1 | 8/2002 | Shi | |

FOREIGN PATENT DOCUMENTS

| | | |
|---|---|---|
| GB | 2 297 885 A | 8/1996 |
| GB | 2 342 255 A | 4/2000 |

* cited by examiner

*Primary Examiner*—Khanh C Tran
(74) *Attorney, Agent, or Firm*—Darby & Darby PC; Robert J. Sacco

(57) ABSTRACT

A system and method for automatic roaming in land mobile radio (LMR) systems are provided. The method includes determining a signal quality value for each of a plurality of communication channels in the LMR system and determining if a signal quality level of a current communication channel is below a predetermined threshold. The method further includes automatically switching communication from the current communication channel to one of the plurality of communication channels if the signal quality level is determined to be below the predetermined threshold.

23 Claims, 3 Drawing Sheets

SYSTEM AND METHOD FOR AUTOMATIC ROAMING IN LAND MOBILE RADIO SYSTEMS

BACKGROUND OF THE INVENTION

This invention relates generally to land mobile radio systems, and more particularly, to a system providing automatic roaming for land mobile radios.

Land mobile radios (LMRs) may be used to provide communication between different mobile units, for example, between individuals communicating using handheld or vehicle mounted units. Land mobile radio band communication, for example, public safety radio communication (e.g., police, fire department, etc.) is generally available within the VHF, UHF, 700 MHz, 800 MHz and 900 MHz frequency bands. Part of each of these frequency bands is allocated by the Federal Communications Commission (FCC) for public safety communication services and are also referred to as Public Safety Frequency Bands. These communications also may be provided using private land mobile radio services (PLMRS).

In known conventional non-trunking LMR units and corresponding RF communication systems, roaming cannot be provided automatically and is provided manually. In these conventional systems there is no control channel and no guarantee of RF transmissions from a current or adjacent coverage area or base station site. The LMR unit in these conventional systems cannot determine automatically when to switch to another channel, for example, a better channel having stronger signal strength or better coverage.

Additionally, the LMR units in conventional LMR systems are not continuously transmitting and there is no control channel. Therefore, it is not possible in these conventional LMR systems to sample signals to determine, for example, signal strength for use in determining whether to switch to another channel. In these systems the base stations are typically configured as amplifiers and repeaters. Thus, the base stations also cannot provide any continuous control signal for sampling.

In these conventional LMR systems, the switching function is performed manually by a user or operator of the LMR unit. For example, a user may know from experience to change the system or channel when reaching a particular area or location. As another example, the user may hear a degradation in the sound quality of the LMR unit and change the system or channel accordingly. The method based on sound quality is problematic in modem digital conventional systems, for example based on Project 25 standard (TIA 102), wherein digital voice coders (vocoders) are used, because the degradation in sound quality or signal may not be apparent to a user until the signal is almost unusable. Thus, a communication session or link may be dropped or lost with very little warning or indication.

Thus, switching between systems or channels in conventional LMR systems is provided manually. This often results in less than acceptable signal strength or clarity of communication. Further, reliability of communications is affected because the switching is based on the manual action of each individual user. Additionally, manually switching requires additional time and effort by the user, and may increase the likelihood of a possible accident, for example, if a user in a vehicle does not pay attention to the road as a result of having to manually switch the LMR unit.

BRIEF DESCRIPTION OF THE INVENTION

In one exemplary embodiment, a method for controlling communication in a non-trunking land mobile radio (LMR) system is provided. The method includes determining a signal quality value for each of a plurality of communication channels in the LMR system and determining if a signal quality value of a current communication channel is below a predetermined threshold. The method further includes automatically switching communication from the current communication channel to one of the plurality of communication channels if the signal quality value of the current communication channel is determined to be below the predetermined threshold.

In another exemplary embodiment, a method for roaming using a non-trunking land mobile radio (LMR) unit is provided. The method includes monitoring a signal quality level of a current communication channel and sampling the signal quality level of a plurality of communication channels of adjacent communication sites when the signal quality level of the current communication channel is below a predetermined threshold. The communication channels are determined based on an adjacent site list stored in the LMR unit. The method further includes automatically switching to one of the plurality of communication channels when the signal from one of the plurality of communication channels exceeds a user programmable criteria.

In yet another exemplary embodiment, a land mobile radio (LMR) is provided that includes a transceiver configured to operate in a non-trunking LMR system and a processor configured to determine a signal quality value for each of a plurality of communication channels in the LMR system and determine if a signal quality value of a current communication channel is below a predetermined threshold. The LMR further includes a controller configured to automatically switch communication from the current communication channel to one of the plurality of communication channels if the signal quality value of the current communication channel is determined to be below the predetermined threshold.

DETAILED DESCRIPTION OF THE INVENTION

Various embodiments of the present invention provide a system and method for automatic roaming for conventional land mobile radios (LMRs). The various embodiments provide for automatically switching an LMR unit between channels or coverage areas/systems based on one or more predetermined thresholds or communication requirements/criteria in a conventional or non-trunking LMR system.

Figure 1:
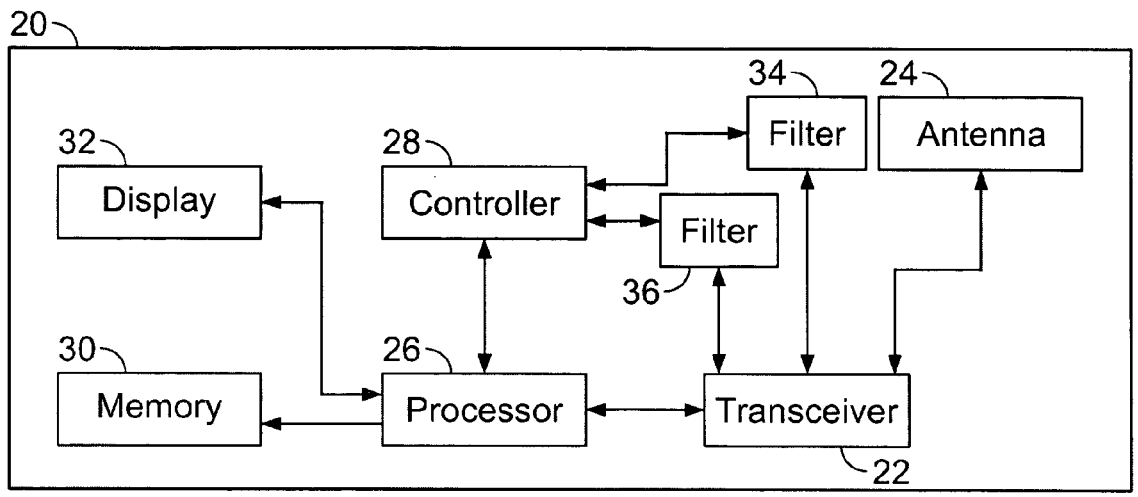
FIG. 1 is a block diagram of an land mobile radio (LMR) unit constructed in accordance with various embodiments of the invention.

In general, various embodiments of the invention provide conventional, non-trunking, LMR units having roaming capabilities providing automatic communication switching. More particularly, and as shown in FIG. 1, various embodiments of the invention provide an LMR unit 20, for example, an LMR radio having a transceiver 22 connected to an antenna 24 for transmitting and receiving signals to provide mobile LMR wireless communication. It should be noted that in various embodiments, modifications are contemplated, such as, for example, a separate transmitter and receiver instead of a combined unit, such as the transceiver 22. The transceiver 22 is connected to a processor 26, which also is connected to a controller 28. The processor 26 also is connected to a memory 30 and a display 32. The controller 28 may include one or more switches for switching between different channels or communication frequencies. The switches may be configured for example, as circulators for controlling connection of the transceiver 22 between a receive filter 34 and a transmit filter 36 for filtering signals that are received and transmitted, respectively, by the LMR unit 20. It should be noted that the receive filter 34 and transmit filter 36 may each include a plurality of bandpass filters for filtering signals on different channels or at different frequencies.

Figure 2:
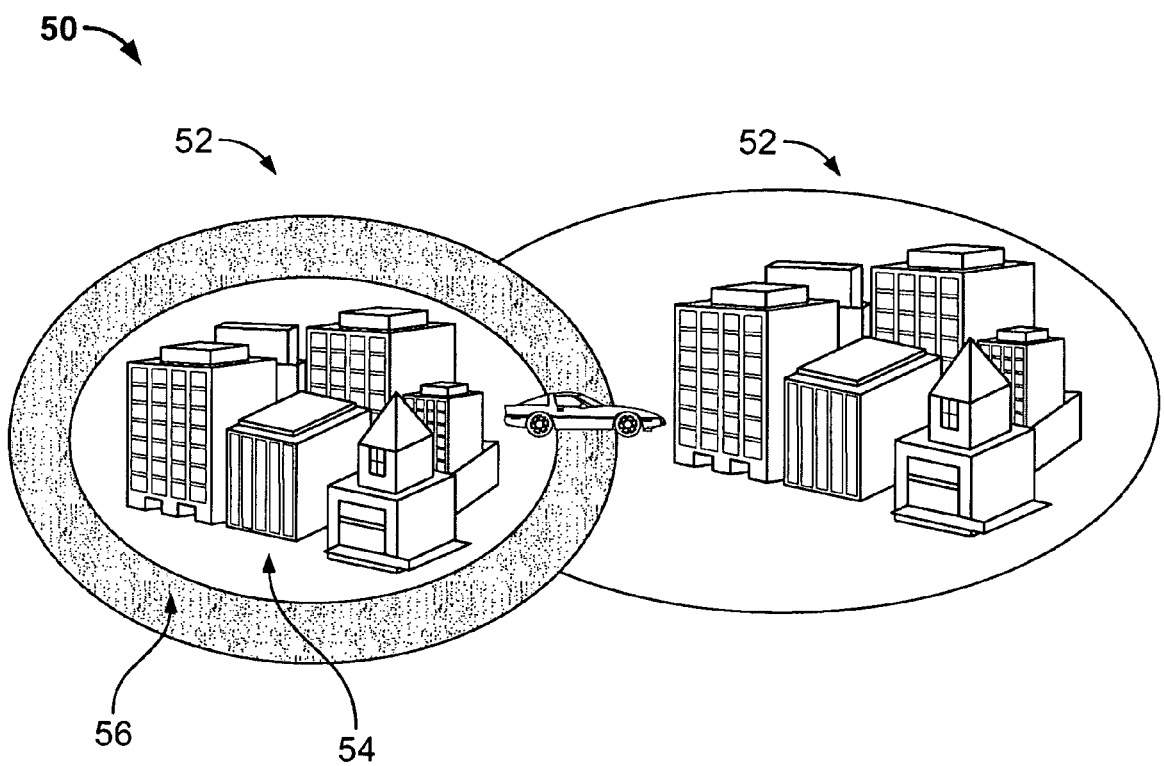
FIG. 2 is a diagram illustrating communication coverage areas of an LMR system.

As shown in FIG. 2, an LMR system 50, and in particular, a conventional non-trunking LMR system, includes a plurality of communication coverage areas 52, which may be defined, for example, by the transmission range of a transmission tower or base station (not shown) in a particular geographic area. Each communication coverage area 52 includes a main coverage region 54 and a peripheral coverage region 56 that together define a coverage area limit. In general, signal strength is stronger in the main coverage region 54 than the peripheral coverage region 56. The coverage regions of communication coverage areas 52 may overlap. For example, the peripheral coverage region 56 of one communication coverage area 52 may overlap with the peripheral coverage region 56 of an adjacent communication coverage area 52. Essentially, the peripheral coverage regions 56 are transition zones between one communication coverage area 52 and another (e.g., adjacent) communication coverage area 52.

Various embodiments of the invention may be implemented in connection with different types of LMR units 20, for example, 7100 Series or 7200 Series radios, available from M/A Com, Inc. (a business unit of Tyco Electronics Corporation) of Lowell, Mass. Further, the LMR units 20 may configured in different shapes, sizes, etc. based on, for example, the particular application for the LMR unit 20. For example, the LMR unit 20 may be configured as a portable unit, a mobile unit, a dash-mount unit, an in-dash unit, etc. In general, various embodiments of the invention provide an LMR unit 20 configured to determine communication quality levels, for example, calculate a signal quality index, and automatically switch channels or systems such that communication is maintained at predetermined quality levels.

In operation, the LMR unit 20 provides automatic switching on a multi-channel, multisite or multicoverage conventional LMR network. Essentially, and as described in more detail herein, the LMR unit 20 operates to communicate using a particular communication coverage area 52 as long as signal of a predetermined quality level is detected. If received signals fall below the predetermined quality level or another threshold or criteria has been met, then the LMR unit 20 searches for another communication coverage area 52, and in particular, another channel in the LMR system 50 (e.g., the radio network). This searching may be based on, for example, a Wide Area System Scan list programmed in the LMR unit 20, which may be stored in the memory 30 (shown in FIG. 1). When a new channel, for example, at a conventional repeater site in a new communication coverage area 52 is identified or located, the LMR unit 20 automatically switches to that new communication coverage area 52, and more particularly, the communication channel (e.g., base station) servicing that communication coverage area 52. The switching may occur based on specific criteria, which may be independent of signal levels. Additionally, or alternatively, a user can select system parameters required for a switch, which may include, for example, defining a threshold level and switch criteria. Further, the switching parameters may be predetermined, for example, based on certain operating conditions.

In general, and as described in more detail below, the criteria used for switching in various embodiments of the invention includes Received Signal Strength Indicator (RSSI), and optionally quality factor measurements. It should be noted that the RSSI metric in various embodiments measures the average signal level for at least one communication site defining a communication coverage area, for example, the signal level for both a selected communication site and adjacent communication sites. The quality factor verifies that the RSSI samples obtained from the adjacent communication sites are from valid conventional channels based on protocol (instead of other interference sources). It should be noted that the combination of RSSI and quality factor measurements is generally referred to herein as digital RSSI (DRSSI).

In operation, the LMR units 20 monitor signal levels of adjacent communication coverage areas serviced by communication sites, for example, once the signal level of the selected communication site falls below a user defined threshold. The LMR units 20 may then switch to another communication coverage area when a communication site is located that meets or exceeds a user programmable criteria.

Figure 3:
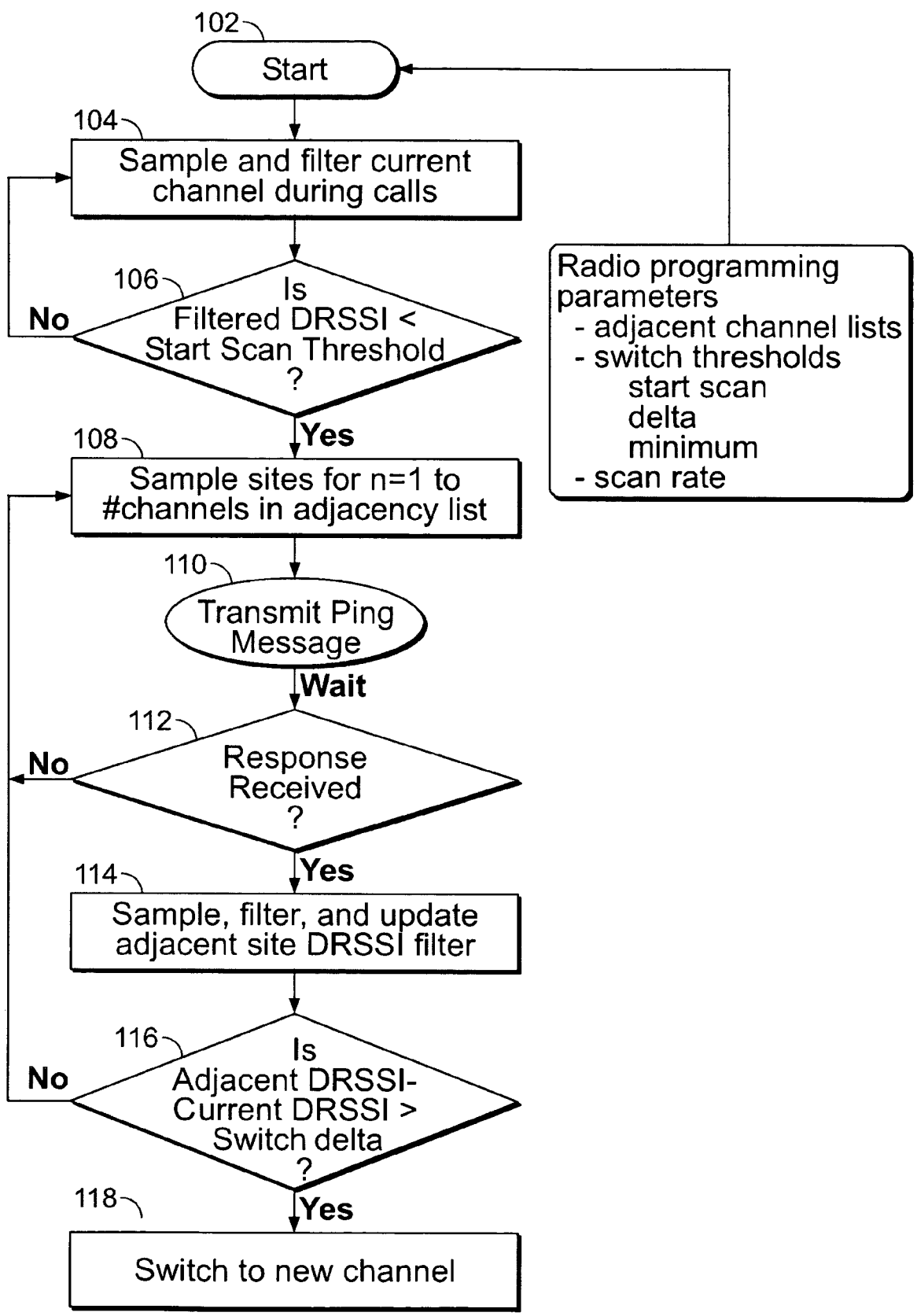
FIG. 3 is a flowchart of a method for providing automatic roaming with automatic switching operation in an LMR system in accordance with various embodiments of the invention.

Various embodiments of the invention include a method 100 of, as shown in FIG. 3, providing automatic roaming with automatic switching operation in a conventional non-trunking LMR system. The method 100 includes identifying at 102 the programming parameters of the LMR unit. This identifying at 102 may include, for example, determining preprogrammed adjacent channel and/or adjacent site lists that identify conventional communication channels at conventional repeater sites adjacent to each communication/repeater site in the LMR network or system. The identifying at 102 further may include, for example, determining switching thresholds, such as, a start scan threshold, a switch delta threshold and a minimum acceptable threshold. The identifying at 102 also may include, for example, identifying operating or control parameters, such as, the scan rate for the LMR unit for scanning for other communication sites. It should be noted that the programming parameters may be predetermined or user defined and may be stored in the memory of the LMR unit. Further, the programming parameter may be updated, for example, periodically or upon certain events (e.g., new software release). The updated programming parameters may be provided to the LMR unit via wireless communication or using a wired link. The updated programming parameters also may be provided dynamically, for example, the adjacent site list information may be provided dynamically via a conventional communication channel of the LMR unit.

After the programming parameters have been determined at 102, signals from the current selected communication site (defining a communication coverage area) are sampled and filtered as described herein during communication periods of the LMR unit at 104. In operation, when a transmission is received from the current selected communication site channel, the LMR unit samples and filters the received RSSI. In particular, the DRSSI is determined, which is based on signal strength (RSSI) and a decoding error rate, such as, for example, a Bit Error Rate (BER). This determination may be performed using any method or procedure known in the art for determining signal strength and for determining a decoding error rate. In various embodiments, the DRSSI is defined by the filtered RSSI weighted by a quality factor (e.g., filtered RSSI value multiplied by a quality factor value). The quality factor in various embodiments is based on successfully decoding a digital message, for example, in a P25 conventional repeater that supports automatic roaming. Alternatively, the quality factor may be eliminated, for example, if the roaming is between conventional analog FM repeater channels.

A determination is then made at 106 as to whether the DRSSI is below a predetermined threshold, and in particular a predetermined start scan threshold. For exemplary purposes only, the DRSSI level for the start scan threshold may be −10. If the DRSSI is not below the start scan threshold, then the signals from the current selected communication site are again sampled and filtered at 104. If the DRSSI is determined to be below the start scan threshold at 106, then at 108 the LMR unit will begin to sample adjacent communication sites, and in particular, other communication channels corresponding to or associated with the adjacent communication sites, at a predetermined scan rate, which may be based on the number of adjacent communication sites in the adjacent site list. For example, if only one communication site is in the adjacent site list, the sampling occurs every ten seconds, and if four communication sites are in the adjacent site list, each communication site is sampled once every forty seconds. Essentially, if the DRSSI falls below the predetermined start scan threshold, the LMR unit is considered to be in the peripheral coverage region defining a transition zone between adjacent communication coverage areas. The scanning will occur at this periodic rate unless the DRSSI falls below a minimum acceptable threshold level, at which time the sampling occurs continuously. For example, if the start scan threshold is a DRSSI of −10, then the minimum acceptable threshold level may be a DRSSI of −18, and if the DRSSI falls to −19 or lower, the sampling then occurs continuously. For example, the sampling of each adjacent communication channel is performed without any time gap or delay between samples.

It should be noted that if the DRSSI of the current communication site falls below a minimum communication threshold level and/or the minimum acceptable threshold level, a warning (e.g., audible or visual warning) is provided by the LMR unit indicating that the user should consider performing or perform a manual switch, for example, switch to the channel of another adjacent communication site. This may be provided by using switches or button on the LMR unit provided in any manner known in the art. Once a determination has been made to sample adjacent communication sites at 108, then at 110, the LMR unit will, for example, periodically transmit, at the scan rate described above, a signal strength sample request signal or acknowledgment request signal, for example, a "ping" message, such as a unique/proprietary digital "ping" message, to each of the adjacent site channels in the adjacent site list. For example, in the P25 protocol, a short message with a special roaming code may be transmitted. It should be noted that a "ping" message also may be used to sample the current selected communication site channel at 104 (e.g., when no communications occur for a predetermined time period).

In operation, the LMR unit will automatically tune to each of the adjacent communication sites, for example, sequentially, and transmit the "ping" message. It should be noted that the "ping" message may be any acknowledgment request signal communicated to a communication channel. After transmitting the "ping" message to an adjacent communication site on a predetermined channel corresponding to the adjacent communication site and as stored in the adjacent site list, the LMR unit remains on the channel for a predetermined period of time, for example, a predetermined number of milliseconds, which may be selected based on the communication or quality requirements for the LMR system, before switching to another channel to sample.

A determination is then made at 112 as to whether a response has been received from the adjacent communication site(s) in response to the "ping" message. If no response has been received, then at 108 the LMR unit will again sample adjacent communication sites at the predetermined scan rate. If a response is received at 112, for example, an acknowledgment signal, then the LMR unit will sample and filter the received signal at 114 to determine a DRSSI, and will store the filtered DRSSI value. It should be noted that the filtering is used to remove noise and average the effects of multipath fading. In the various embodiments, the DRSSI value corresponding to the adjacent communication site will be updated in the memory (e.g., stored in connection with the identifier for the communication site) of the LMR unit on the next "ping" message cycle.

A determination is then made at 116 as whether the filtered DRSSI value for one or more of the communication sites in the adjacent site list is greater than the filtered DRSSI signal for the current communication site by a predetermined switch delta value. The switch delta value may be predetermined or may be user definable. Essentially, the DRSSI value for a scanned communication site must be better (e.g., greater) then the DRSSI value for the current selected communication site before the LMR unit roams into the adjacent communication coverage area serviced by the communication site. In particular, if the DRSSI value is not greater than the switch delta value, then at 108 the LMR unit will again sample adjacent communication channels at the predetermined scan rate. If the DRSSI value is greater than the switch delta value, then the LMR unit automatically switches to a communication channel for that adjacent communication site as determined in the adjacent site list. For example, if the switch delta value is −5, and the adjacent communication site has a DRSSI of −6 compared to a DRSSI of −10 for the current communication site, then the LMR unit will not switch to the adjacent communication site because the difference is −4, which is less than the switch delta value of −5. However, if the adjacent communication site has a DRSSI of −6 compared to a DRSSI of −12 for the current communication site, then the LMR unit will switch to the adjacent communication site because the difference is −6, which is greater than the switch delta value of −5. Upon switching channels, the LMR unit may optionally transmit a login message to establish communication with the adjacent communication channel at 118. This login or communication link setup process may be performed using any procedure known in the art.

It should be noted that each LMR unit may be calibrated based on, for example, the particular communication requirements or application for that LMR unit. For example, the level setting for the DRSSI corresponding to a dBm value may be different for different LMR units. For example, a −10 RSSI value may correspond to a −80 dBm on one LMR unit and a −75 dBm on another LMR unit.

Figure 4:
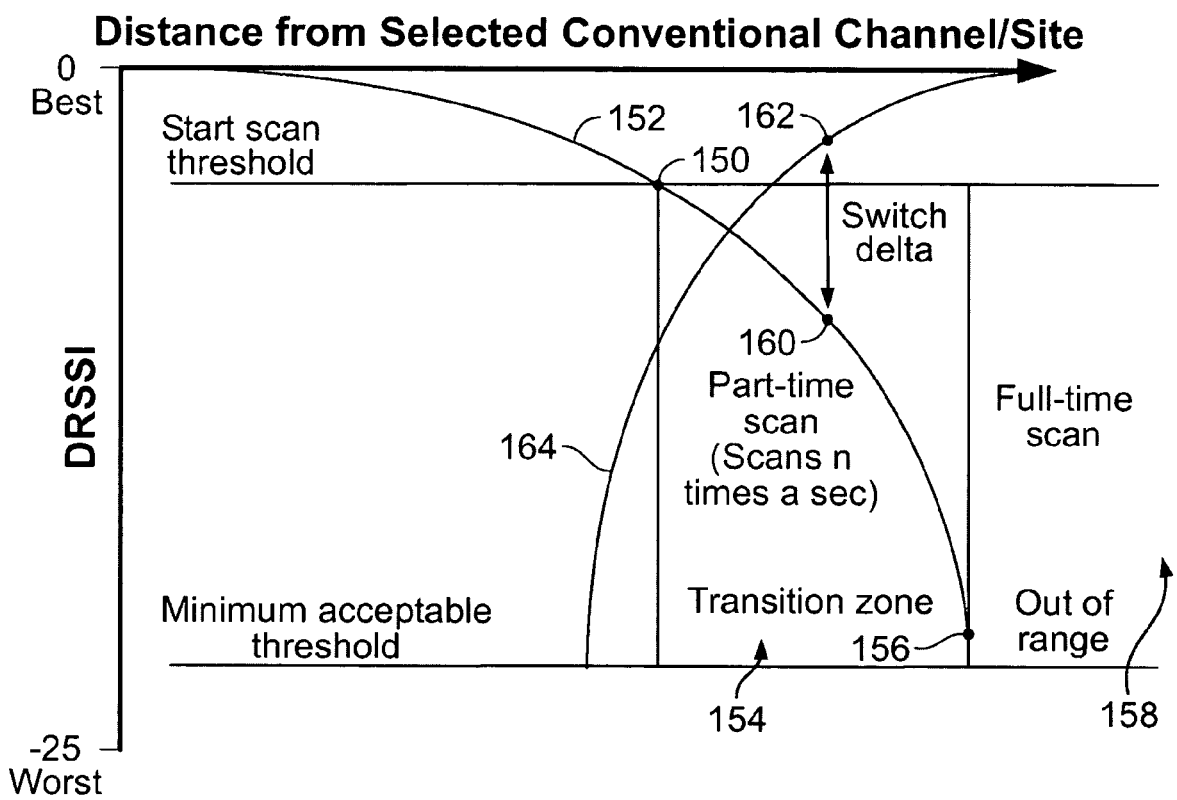
FIG. 4 is a chart illustrating the switching characteristics provided by various embodiments of the invention.

Thus, as shown in FIG. 4, a start scan threshold defines a start scan point 150 on a signal 152 received from the current selected communication site and defines a periodic or part time scan or sampling range 154. A minimum acceptable threshold level is used to define an out of range point 156 (in this example slightly higher than the minimum acceptable threshold) and defines a continuous or full time scan or sampling range 158. The switch delta value defines a value between a sample point 160 on the signal 152 and a sample point 162 on a signal 164 received from an adjacent communication site and which defines when the LMR unit switches to a communication channel to communicate with the adjacent communication site. As can be seen from FIG. 4, when switching from point 160 to point 162, the DRSSI increases to a level greater than the start scan point 150 on the signal 152. Thus, by defining the start scan threshold level, the minimum acceptable threshold level and the switch delta value, the sampling and switching parameters for the LMR unit, such as, for example, the roaming and switching parameters may be set.

In operation, and with reference again to the method 100 shown in FIG. 3, the LMR unit 20 monitors the communication channel during transmissions. Specifically, when a transmission by a communication channel occurs, the LMR unit 20 monitors the quality of the received signal at 104. It should be noted that the transmission does not have to be addressed to the LMR unit 20. It should further be noted that the LMR unit 20 may initiate a timer and "ping" the current channel to obtain an RSSI sample if there is an extended period of inactivity. It should also be noted that the channel may be configured to provide automatic conventional roaming and may initiate a transmission automatically if there is an extended period of inactivity. The quality of the received signal is then determined from a combination of received codeword error rates and the filtered RF signal strength (filtered RSSI) at 104 as described herein. In various embodiments, the RSSI filter for the selected channel may be defined as:

$$Y(n)=[\text{Filtered RSSI}]*[\text{Quality Factor}]$$

The Quality Factor, which is optionally included, is based on the success of decoding messages, such as, for example, NIDs in the APCO Project 25 protocol. The filter in various embodiments is initialized with a first weighted sample. For example, the LMR unit 20 may obtain three samples at fifteen millisecond (msec) intervals and calculate the arithmetic average of the RSSI values. The arithmetic average then may be used as a single sample.

In various embodiments, the LMR unit 20 is programmed with a fixed adjacent site list, which may be in table form, and provided in different embodiments as follows:
1. The LMR unit 20 uses static/fixed information for the adjacent site list (e.g., no broadcast of adjacency messages). In fixed mode, the LMR unit 20 uses a fixed list of pre-programmed communication sites (e.g., a Wide Area System Scan list) that are added to the adjacent site list at power-up of the LMR unit 20.
2. The LMR unit 20 may use a combination of fixed and dynamic information, adding or replacing sites to the adjacent site list if information is received from communication channels.
3. The conventional LMR unit 20 may sample a trunked system as an adjacent communication site. Without broadcast information, the LMR unit 20 can scan a trunked site, but the LMR unit 20 will then be pre-programmed with channel frequency parameters and an assumption about the control channel location.

As described in more detail herein, the start scan threshold defines when the LMR unit 20 begins to sample signals from adjacent communication sites at 106. Essentially, upon determining that the DRSSI value for a selected channel falls below the start scan threshold, the LMR unit 20 begins sampling periodically. The scan rate is defined by the scan rate parameter and in various embodiments samples one channel per sampling event. Thus, based on the scan rate parameter, a determination is made as to when to initiate sampling of an adjacent communication site. It should be noted that different start scan thresholds may be provided, for example, the LMR unit 20 may have a priority system transition level and a non-priority system transition level.

Upon determining that a sample from an adjacent communication site should be initiated, and in an exemplary embodiment, the LMR unit 20 performs the following procedure:
1. If the adjacent site channel is currently active, the LMR unit 20 obtains an RSSI sample and then returns to the current channel.
2. If the adjacent site channel is not currently active, the LMR unit 20 may transmit an acknowledgment request signal or "ping" message on the adjacent site channel at 110.
3. If the adjacent site channel detects the message and responds at 112, the LMR unit 20 samples the signal at 114 regardless of whether the LMR unit 20 can decode the response.
4. If the LMR unit 20 does not detect a response, the LMR unit 20 may optionally enter a minimum signal level as the RSSI sample.

Thus, the adjacent channel/communication site sampling or sample event includes tuning to the adjacent site channel, transmitting the message, waiting for a response, sampling the RSSI, and retuning to the selected or current channel. This sampling event in an exemplary embodiment occurs in less than 350 msec.

After sampling the adjacent site channel the LMR unit 20 updates the quality metric for that adjacent communication site at 114. For example, the filter may be initialized with the weighted first sample as described herein and in various embodiments with the quality metric for adjacent communication sites based on signal strength. If the quality factor is included, the quality factor is based on a message verification metric. The message verification metric verifies that the RSSI samples obtained from adjacent communication sites are from valid channels (e.g., valid P25 conventional channels and not an interfering site).

In some embodiments, after sampling all of the adjacent communication sites in the adjacent list a predetermined number of times (e.g., twice), the LMR unit 20 sorts the adjacent site/channel list and starts sampling the stronger channels more frequently at 108 (e.g., every other sample for the two strongest adjacent channels). The LMR unit 20 also periodically resorts the list. It should be noted that the LMR unit 20 maintains the DRSSI values for the selected communication channel and adjacent communication channels and compares the values, for example, periodically. The LMR unit 20 may be configured to require a minimum number of samples (e.g., seven samples) before making a determination whether to switch to an adjacent communication channel.

As described in more detail herein, the LMR unit 20 also is programmed with the switch delta parameter. This parameter generally provides user control over the minimum improvement desired when the LMR unit 20 switches from one channel to another at 118. In particular, the DRSSI value for a scanned channel must be better than the value for the selected channel by a magnitude of at least the switch delta (as determined at 116) before the LMR unit 20 will roam into the adjacent channel/communication site. In operation, the LMR unit 20 locates a channel that is better than the selected channel by more than the switch delta. The LMR unit 20 then automatically tunes to the new channel at 118. Further, and in various embodiments, at the first opportunity, the LMR unit 20 attempts to confirm connection on the channel by transmitting a registration message and receiving a response or repeating a message sequence to confirm. It should be noted that if the LMR unit 20 cannot confirm and make a connection on an adjacent channel, the LMR unit 20 may return to the prior channel.

The LMR unit 20 retains the prior channel/communication site information and adjacent site list and corresponding information until the LMR unit 20 connects to the new channel at 118. After connecting to the new channel, the LMR unit 20 clears the information (e.g., DRSSI values, etc.) in the adjacent site list and begins generating a new adjacent site list, for example, based on a master communication site list stored in the memory of the LMR unit 20. Alternatively, the LMR unit 20 may retain the DRSSI values and sample counters for the channels that are also in the adjacency list for the new communication site or channel. After confirmation of connection to the adjacent channel, the LMR unit 20 enters an idle state on the new channel and again begins the monitoring process at 102.

Modifications to the various embodiments are contemplated. For example, conventional LMR communication sites that normally do not transmit autonomously may broadcast messages periodically for sampling by LMR units operating on a channel and on adjacent communication sites. These transmission can be synchronized, for example, throughout a wide area network, such that the LMR units 20 can reduce the number of "pings" that are used. The LMR units 20 also may include a manual override button.

Additionally modifications to the various embodiments include, for example, programming a channel preference for each communication site or channel that provides a weighting value to be used in the switching determination. Thus, the switching determination in this embodiment depends on whether the LMR unit 20 is using a priority system/channel or a non-priority system/channel as defined by the channel preference. In another embodiment, the LMR unit 20 may be programmed with a channel preferences based on a type of service to be used (e.g., data service). Additionally, the LMR units 20 may be configured to perform read/write operations directly to and from the stored adjacent site lists.

Further, additional functionality may be provided to the various embodiments. For example, if an LMR unit 20 assigned to a channel leaves the coverage area of the assigned communication site, the LMR unit 20 will lose the communication link. The LMR unit 20 may be configured to use the adjacent site list to attempt to first switch to a communication site/channel with the next best signal quality as measured during the scanning process.

The various embodiments or components, for example, the LMR unit 20 or components or controllers therein, may be implemented as part of one or more computer systems, which may be separate from or integrated with the LMR unit 20 or LMR system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for controlling communication in a non-trunking land mobile radio (LMR) system, said method comprising:
   determining a signal quality value for each of a plurality of communication channels in the LMR system using a signal strength sample request signal transmitted from an LMR unit;
   determining if a signal quality value of a current communication channel is below a predetermined threshold; and
   automatically switching communication from the current communication channel to one of the plurality of communication channels if the signal quality value for the current communication channel is determined to be below the predetermined threshold.

2. A method in accordance with claim 1 wherein determining the signal quality value for each of the plurality of communication channels comprises determining a Received Signal Strength Indicator (RSSI).

3. A method in accordance with claim 1 wherein determining the signal quality value for each of the plurality of communication channels comprises determining a Digital Received Signal Strength Indicator (DRSSI), the DRSSI based on a Received Signal Strength Indicator (RSSI) and a decoding error rate.

4. A method in accordance with claim 1 wherein automatically switching comprising determining a switch delta value between the signal quality value of the current communication channel and the signal quality value of the plurality of communication channels, and switching to one of the plurality of communication channels when the switch delta value exceeds a predetermined level.

5. A method in accordance with claim 1 further comprising determining if the signal quality value for the current communication channel is below a predetermined start scan threshold and determining the signal quality value for each of the plurality of communication channels when the signal quality value for the current communication channel is below the predetermined start scan threshold.

6. A method in accordance with claim 5 wherein determining the signal quality value for each of the plurality of communication channels comprises periodically sampling the signal quality value for each of the plurality of communication channels if the signal quality value for the current communication channel is below the predetermined start scan threshold.

7. A method in accordance with claim 1 further comprising determining if the signal quality value for the current communication channel is below a predetermined minimum acceptable threshold and if the determined signal qualily value is below the predetermined minimum acceptable threshold continuously sampling the signal quality value for each of the plurality of communication channels.

8. A method in accordance with claim 7 further comprising providing a warning indication if the signal quality value for the current communication channel is below the predetermined minimum acceptable threshold.

9. A method in accordance with claim 1 wherein determining the signal quality value for each of the plurality of communication channels comprises defining a scan frequency for sampling the plurality of communication channels to determine the signal quality value.

10. A method in accordance with claim 1 further comprising transmitting the signal strength sample request signal to at least one of a plurality of communication sites associated with the plurality of communication channels.

11. A method in accordance with claim 10 further comprising measuring a Received Signal Strength Indicator (RSSI) for each response to the signal strength sample request signal to determine the signal quality value.

12. A method in accordance with claim 1 further comprising accessing an adjacent site list to determine the plurality of communication channels to sample to determine the signal quality value, the plurality of communication channels comprising a plurality of communication channels corresponding to adjacent communication sites.

13. A method in accordance with claim 12 further comprising switching to one of the communication channels in the adjacent site list when communication fails.

14. A method in accordance with claim 1 wherein the predetermined threshold is user defined.

15. A method in accordance with claim 1 further comprising sampling the current communication channel to determine the signal quality value of the current communication channel.

16. A method in accordance with claim 1 further comprising transmitting the signal strength sample request signal to a communication site associated with the current communication channel and determining signal quality based on a received signal.

17. A method in accordance with 1 further comprising transmitting the signal strength sample request signal via at least one of (i) the current communication channel and (ii) a land mobile radio in the LMR system after a predetermined period of communication inactivity of the current communication channel.

18. A method for roaming using a non-trunking land mobile radio (LMR) unit, said method comprising:
    monitoring a signal quality level of a current communication channel in an LMR network based on a received signal in response to a periodically transmitted signal strength sample request signal;
    sampling the signal quality level of a plurality of communicalion channels of adjacent communication sites in the LMR network when the signal quality level of the current communication channel is below a predetermined threshold, wherein the communication channels are determined based on an adjacent site list stored in the LMR unit; and
    automatically switching to one of the plurality of communication channels in the LMR network when a signal from one of the plurality of communication channels exceeds a user programmable criteria.

19. A method in accordance with claim 18 further comprising at least one of generating the adjacent site list upon powering on of the LMR unit and dynamically updating the adjacent site list.

20. A method in accordance with claim 18 wherein the signal quality level is based on an average of Received Signal Strength Indicator (RSSI) values.

21. A method in accordance with claim 18 wherein the predetermined threshold is based on one of a priority system transition level and a non-priority system transition level.

22. A method in accordance with claim 18 further comprising performing a minimum number of samples before determining whether to switch to one of the plurality of communication channels.

23. A land mobile radio (LMR) comprising:
    a transceiver configured to operate in a non-trunking LMR system;
    a processor configured to determine a signal quality value for each of a plurality of communication channels in the LMR system based on a signal strength sample request signal transmitted from the transceiver and determine if a signal quality value of a current communication channel is below a predetermined threshold; and
    a controller configured to automatically switch communication from the current communication channel to one of the plurality of communication channels if the signal quality value of the current communication channel is determined to be below the predetermined threshold.

* * * * *